United States Patent
Boersma et al.

(10) Patent No.: US 8,903,882 B2
(45) Date of Patent: Dec. 2, 2014

(54) METHOD AND DATA PROCESSING UNIT FOR CALCULATING AT LEAST ONE MULTIPLY-SUM OF TWO CARRY-LESS MULTIPLICATIONS OF TWO INPUT OPERANDS, DATA PROCESSING PROGRAM AND COMPUTER PROGRAM PRODUCT

(75) Inventors: Maarten J. Boersma, Holzgerlingen (DE); Markus Kaltenbach, Leinfelden (DE); Jens Leenstra, Bondorf (DE); Tim Niggemeier, Laatzen (DE); Philipp Oehler, Gaertringen (DE); Philipp Panitz, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 13/183,639

(22) Filed: Jul. 15, 2011

(65) Prior Publication Data
US 2012/0150933 A1    Jun. 14, 2012

(30) Foreign Application Priority Data
Dec. 13, 2010    (EP) ...................................... 10194656

(51) Int. Cl.
*G06F 7/38*    (2006.01)
*G06F 7/53*    (2006.01)

(52) U.S. Cl.
CPC .......... *G06F 7/53* (2013.01); *G06F 2207/3828* (2013.01); *G06F 2207/382* (2013.01)
USPC ............................ 708/523; 708/230; 708/490

(58) Field of Classification Search
None
See application file for complete search history.

(56) References Cited

U.S. PATENT DOCUMENTS

| 7,024,444 B1 | 4/2006 | Green |
| 7,506,017 B1 | 3/2009 | Dupenloup |
| 8,645,448 B2 * | 2/2014 | Elliott ........................... 708/492 |
| 2003/0135530 A1 | 7/2003 | Parthasarathy et al. |
| 2009/0136022 A1 | 5/2009 | Langendoerfer et al. |

OTHER PUBLICATIONS

Gueron, Shay, et al., "Efficient Implementation of the Galois Counter Mode Using a Carry-less Multiplier and a Fast Reduction Algorithm," (Abstract Only) Information Processing Letters, Jul. 2010, pp. 549-553, vol. 110, Issue 14-15, Elsevier North-Holland, Amsterdam, The Netherlands (3 pages).

(Continued)

*Primary Examiner* — Michael D Yaary
(74) *Attorney, Agent, or Firm* — Matthew W. Baca; James L. Baudino

(57) ABSTRACT

Various systems, apparatuses, processes, and programs may be used to calculate a multiply-sum of two carry-less multiplications of two input operands. In particular implementations, a system, apparatus, process, and program may include the ability to use input data busses for the input operands and an output data bus for an overall calculation result, each bus including a width of 2n bits, where n is an integer greater than one. The system, apparatus, process, and program may also calculate the carry-less multiplications of the two input operands for a lower level of a hierarchical structure and calculating the at least one multiply-sum and at least one intermediate multiply-sum for a higher level of the structure based on the carry-less multiplications of the lower level. A certain number of multiply-sums may be output as an overall calculation result dependent on mode of operation using the full width of said output data bus.

13 Claims, 8 Drawing Sheets

(56) References Cited

OTHER PUBLICATIONS

Jebelean, Tudor, "Using the Parallel Karatsuba Algorithm for Long Integer Multiplication and Division [online]" [retrieved before Jul. 14, 2010], [retrieved from http://www.springerlink.com/content/57111753xj371742/] (7 pages).

Kumar, Vinay, "Analysis, Verification and FPGA Implementation of Vedic Multiplier with BIST Capability," Thesis Report for Department of Electronics and Communication Engineering, Jun. 2009, Thapar University, Patiala, India (72 pages).

"MPIR Development Projects [online]" [retrieved before Jul. 14, 2010] [retrieved from http://www.mpir.org/projects.html] Multiple Precision Integers and Rationals Integer Library (6 pages).

Paar, Christof, "A New Architecture for a Parallel Finite Field Multiplier with Low Complexity Based on Composite Fields," IEEE Transactions on Computers, Jul. 1996, pp. 856-861, vol. 45, No. 7, IEEE (6 pages).

Patel, Pujan, "Parallel Multiplier Designs for the Galois/Counter Mode of Operation," Thesis in Electrical and Computer Engineering, 2008, University of Waterloo, Waterloo, Ontario, Canada (89 pages).

Gueron, Shay, et al., "Intel Carry-Less Multiplication Instruction and Its Usage for Computing the GCM Mode," White Paper, Jan. 2010, Intel Corporation (72 pages).

Krishnankutty, Deepak, "Implementation of a Generic Modular Cryptosystem for the RSA on Reconfigurable Hardware," Thesis in Department of Computer Science & Engineering, 2009, National Institute of Technology, Rourkela, India (70 pages).

Yang, Bo, et al, "High Speed Architecture for Galois/Counter Mode of Operation (GCM)," International Symposium on Circuits and Systems, New Orleans, LA, May 2007, pp. 1863-1866, IEEE (15 pages).

Anderson, Dan, "Carryless Multiplication Optimization for AES GCM Mode in Solaris," Nov. 2010 [retrieved from http://blogs.oracle.com/DanX/entry/carryless_multiplication_optimization_for_aes] (8 pages).

* cited by examiner

VA[0:127]

| $A_{HW}0$ | $A_{HW}1$ | ... | ... | ... | $A_{HW}7$ |

0...15 16...31                    112...127

VB[0:127]

| $B_{HW}0$ | $B_{HW}1$ | ... | ... | ... | $B_{HW}7$ |

0...15 16...31                    112...127

$prod_{HW}[0]=A_{HW}0*B_{HW}0$
$prod_{HW}[1]=A_{HW}1*B_{HW}1$
$prod_{HW}[2]=A_{HW}2*B_{HW}2$
$prod_{HW}[3]=A_{HW}3*B_{HW}3$ $prod_{HW}[4]=A_{HW}4*B_{HW}4$
$prod_{HW}[5]=A_{HW}5*B_{HW}5$
$prod_{HW}[6]=A_{HW}6*B_{HW}6$
$prod_{HW}[7]=A_{HW}7*B_{HW}7$ $VT_{HW}[0:127]$

| $T_{HW}0$ | $T_{HW}1$ | $T_{HW}2$ | $T_{HW}3$ |

0...31 32...63 64...95 96...127

$T_{HW}0[0:31]\ \ \ =prod_{HW}[0]\wedge prod_{HW}[1]$
$T_{HW}1[32:63]\ \ =prod_{HW}[2]\wedge prod_{HW}[3]$
$T_{HW}2[64:95]\ \ =prod_{HW}[4]\wedge prod_{HW}[5]$
$T_{HW}3[96:127]=prod_{HW}[6]\wedge prod_{HW}[7]$

| $A_B0$ | $A_B1$ | ... | ... | ... | $A_B15$ |

0...7 8...15                    120...127

VB[0:127]

| $B_B0$ | $B_B1$ | ... | ... | ... | $B_B15$ |

0...7 8...15                    120...127

$prod_B[0]=A_B0*B_B0$      $prod_B[6]\ \ \ =A_B6*B_B6$      $prod_B[12]=A_B12*B_B12$
$prod_B[1]=A_B1*B_B1$      $prod_B[7]\ \ \ =A_B7*B_B7$      $prod_B[13]=A_B13*B_B13$
$prod_B[2]=A_B2*B_B2$      $prod_B[8]\ \ \ =A_B8*B_B8$      $prod_B[14]=A_B14*B_B14$
$prod_B[3]=A_B3*B_B3$      $prod_B[9]\ \ \ =A_B9*B_B9$      $prod_B[15]=A_B15*B_B15$
$prod_B[4]=A_B4*B_B4$      $prod_B[10]=A_B10*B_B10$
$prod_B[5]=A_B5*B_B5$      $prod_B[11]=A_B11*B_B11$ $VT_B[0:127]$

| $T_B0$ | $T_B1$ | ... | ... | ... | $T_B7$ |

0...15 16...31                    112...127

$T_B0[0:15]\ \ \ \ =prod_B[0]\wedge prod_B[1]$        $T_B4[64:79]\ \ \ \ =prod_B[8]\wedge prod_B[9]$
$T_B1[16:31]\ \ =prod_B[2]\wedge prod_B[3]$        $T_B5[80:95]\ \ \ \ =prod_B[10]\wedge prod_B[11]$
$T_B2[32:47]\ \ =prod_B[4]\wedge prod_B[5]$        $T_B6[96:111]\ \ =prod_B[12]\wedge prod_B[13]$
$T_B3[48:63]\ \ =prod_B[6]\wedge prod_B[7]$        $T_B7[112:127]=prod_B[14]\wedge prod_B[15]$

METHOD AND DATA PROCESSING UNIT FOR CALCULATING AT LEAST ONE MULTIPLY-SUM OF TWO CARRY-LESS MULTIPLICATIONS OF TWO INPUT OPERANDS, DATA PROCESSING PROGRAM AND COMPUTER PROGRAM PRODUCT

BACKGROUND

The present disclosure relates in general to the field of processing systems, and in particular to processing systems for cryptographic applications.

In the U.S. Pat. No. 7,506,017 B1, entitled "VERIFIABLE MULTIMODE MULTIPLIERS" and issued to Dupenloup, a verifiable duplex multiplier circuit is disclosed. In one mode, the circuitry of the duplex multiplier functions as an N-bit× N-bit multiplier. In another mode, the circuitry of the duplex multiplier operates as dual (N/2)-bit×(N/2)-bit multipliers. Because the same circuitry can be used to serve as both an N×N multiplier and as dual N/2×N/2 multipliers, integrated circuit resources are conserved. The duplex multiplier circuitry uses an architecture that can be automatically synthesized using a logic synthesis tool. Verification operations can be performed using logic-equivalency error checking tools. Exhaustive verification is possible using this approach, even when relatively large duplex multipliers (e.g., duplex multipliers with N values of 16 or more) are used.

In U.S. Pat. No. 7,024,444 B1, entitled "SPLIT MULTIPLIER ARRAY AND METHOD OF OPERATION" and issued to Green, a multiplier circuit for use in a data processor is disclosed. The multiplier circuit comprises a partial products generating circuit that receives a multiplicand value and a multiplier value and generates a group of partial products. The multiplier circuit also comprises a split array for adding the partial products. A first summation array comprises a first group of adders that sum the even partial products to produce an even summation value. A second summation array comprises a second group of adders that sum the odd partial products to produce an odd summation value. The even and odd summation values are then summed to produce the output of the multiplier.

SUMMARY

In one general implementation, a process for calculating a multiply-sum of two carry-less multiplications of two input operands may include the ability to use input data busses for the input operands and an output data bus for an overall calculation result. Each bus may include a width of 2n bits, where n is an integer greater than one. The process may also calculate the carry-less multiplications of the two input operands for a lower level of a hierarchical structure and calculate the at least one multiply-sum and at least one intermediate multiply-sum for a higher level of the structure based on the carry-less multiplications of the lower level. The process may further output number of multiply-sums as an overall calculation result dependent on mode of operation using the full width of said output data bus. The process may, for example, be implemented by a data processing unit and/or a computer program product.

BRIEF DESCRIPTION OF THE DRAWINGS

FIG. 9 is a schematic diagram of a polynomial multiply-sum on half-word basis.

FIG. 10 is a schematic diagram of a polynomial multiply-sum on byte basis.

DETAILED DESCRIPTION

Figure 1:
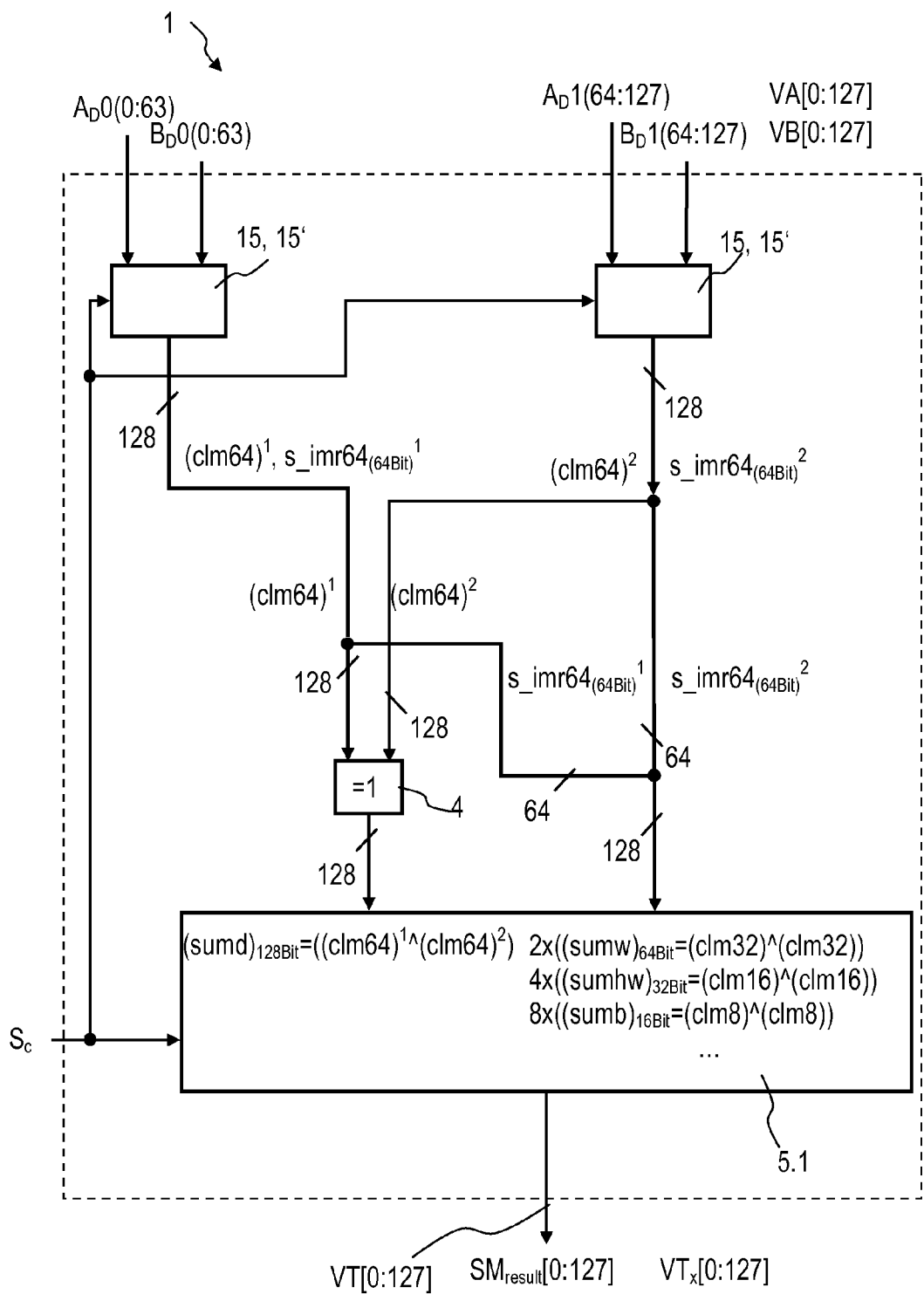
FIG. 1 is a schematic block diagram of a top level (j) of a hierarchical structure of a data processing unit for calculating at least one multiply-sum of two carry-less multiplications of two input operands, in accordance with some embodiments.

Various systems, apparatuses, processes, and programs may be used to accelerate calculation of at least one multiply-sum of two carry-less multiplications of two input operands. Carry-less multiplications, along with their multiply sums, are used in cryptographic and checksum applications. Thus, increasing their calculation speed is useful in a wide variety of data security implementations.

In some embodiments, a process for calculating at least one multiply-sum of two carry-less multiplications of two input operands includes using input data busses for the input operands and an output data bus for an overall calculation result, wherein each bus includes a width of 2n bits, with n=2, 3, .... To accomplish the calculation, the process calls for implementing a hierarchical structure including at least two levels for calculating at least one of different carry-less multiplication results and intermediate multiply-sum results. The process also includes calculating the at least one multiply-sum result and at least one intermediate multiply-sum results of a level (i) based on the carry-less multiplication results of a level (i−1) and outputting a certain number of multiply-sum results as an overall calculation result dependent on mode of operation using full width (2n) of said output data bus.

In particular embodiments, the full bit width of the carry-less multiplications results of the level (i−1) is used for calculating the at least one multiply-sum result of the level (i), and half of the bit width of the carry-less multiplication results of the level (i−1) is used for calculating the at least one intermediate multiply-sum results of the level (i).

In certain embodiments, a top level of the hierarchical structure calculates and outputs a first multiply-sum result of two carry-less multiplications of two input operands each including a width of n bits by using a bit-wise exclusive OR function.

In some embodiments, a bottom level of the hierarchical structure calculates and outputs carry-less basic multiplication results of two input operands each including a certain basic width of m bits, where m=2, 3, ..., n/m=2j, and j=0, 1, 2, ....

Additionally, certain embodiments include a first mode of operation outputting the first multiply-sum as overall calculation result and at least one further mode of operation calculating $2^k$ intermediate multiply-sum results of two carry-less multiplications of two input operands each including a width of n/$2^k$ bits, with k=1, 2, . . . , depending on the further mode of operation, by using exclusive OR functions in sub levels of the hierarchical structure for summing the multiplication results; and outputting the $2^k$ intermediate multiply-sum results as overall calculation result.

In further embodiments, a data processing unit for calculating at least one multiply-sum of two carry-less multiplications of two input operands includes input data busses for the input operands and an output data bus for an overall calculation result each including a width of 2n bits, with n=2, 3, . . . . The data processing unit also includes a hierarchical structure including at least two levels for calculating at least one of different carry-less multiplication results and intermediate multiply-sum results. The hierarchical structure may, for example, be implemented as a Karatsuba-Ofman structure. The data processing unit calculates the at least one multiply-sum result and at least one intermediate multiply-sum results of a level (i) based on the carry-less multiplication results of a level (i−1) and outputs a certain number of multiply-sum results as overall calculation result depending on mode of operation using full width (2n) of the output data bus.

In certain embodiments, the hierarchical structure uses full bit width of said carry-less multiplication results of the level (i−1) for calculating the at least one multiply-sum result of the level (i), and half of the bit width of the carry-less multiplication results of the level (i−1) for calculating the at least one intermediate multiply-sum results of the level (i).

Particular embodiments include, in a top level of the hierarchical structure, an exclusive OR function gate bit-wise calculating a first multiply-sum result of two carry-less multiplications of two input operands each including a width of n bits.

Some embodiments include, in a bottom level of said hierarchical structure, at least one basic multiplier calculating and outputting carry-less basic multiplication results of two input operands each including a certain basic width of m bits, with m=2, 3, . . . , n/m=2j, and j=0, 1, 2, . . . .

Additionally, certain embodiments include, in sub levels of said hierarchical structure, components calculating $2^k$ intermediate multiply-sum results of two carry-less multiplications of two input operands each including a width of n/$2^k$ bits, with k=1, 2, . . . , depending on the mode of operation and exclusive OR function gates for bit-wise summing and outputting the multiplication results.

Some embodiments include at least one multiplexer for outputting the first multiply-sum as overall calculation result in a first mode of operation, and for outputting the $2^k$ intermediate multiply-sum results as overall calculation result in at least one further mode of operation.

In further embodiments, exclusive OR function gates used in sub levels of a Karatsuba-Ofman structure to calculate the carry-less multiplication results are also used for calculating the ($2^k$) intermediate multiply-sum results.

In certain embodiments, a data processing program for execution in a data processing system may include software code portions for performing a process for calculating at least one multiply-sum of two carry-less multiplications of two input operands when the program is run on the data processing system. In some embodiments, a computer program product stored on a computer-usable medium includes a computer-readable program for causing a computer to perform a method for calculating at least one multiply-sum of two carry-less multiplications of two input operands when the program is run on the computer.

Various embodiments allow enhancing existing n×n polynomial multiplier structures to support and output results of subtypes n/$2^k$×n/$2^k$ polynomial multiplier structures. With this, polynomial multiplication of two input operands A(0:63) and B(0:63) can be considered as one 64×64 bit multiplication, two 32×32 bit multiplications, four 16×16 bit multiplications, and/or eight 8×8 bit multiplications. The 64×64 polynomial multiplier structure may be used in particular implementations since such a structure matches with VSU data flow.

In particular embodiments, n×n polynomial multiplier structures are used to calculate polynomial multiply-sums of two n/$2^k$×n/$2^k$ polynomial multiplications of two input operands, with k=0, 1, 2, . . . . Use of a 64×64 polynomial multiplier structure allows calculating polynomial multiply-sums on double-word basis, on word basis, on half-word basis, or on byte basis. These polynomial multiply-sums may be used to accelerate calculation for cryptographic and checksum applications, like in AES (advanced encryption standard) applications using GCM (Galois counter mode of operation) or in CRC (cyclic redundancy check) needing polynomial multiplication on various data widths depends on application.

Figure 2:
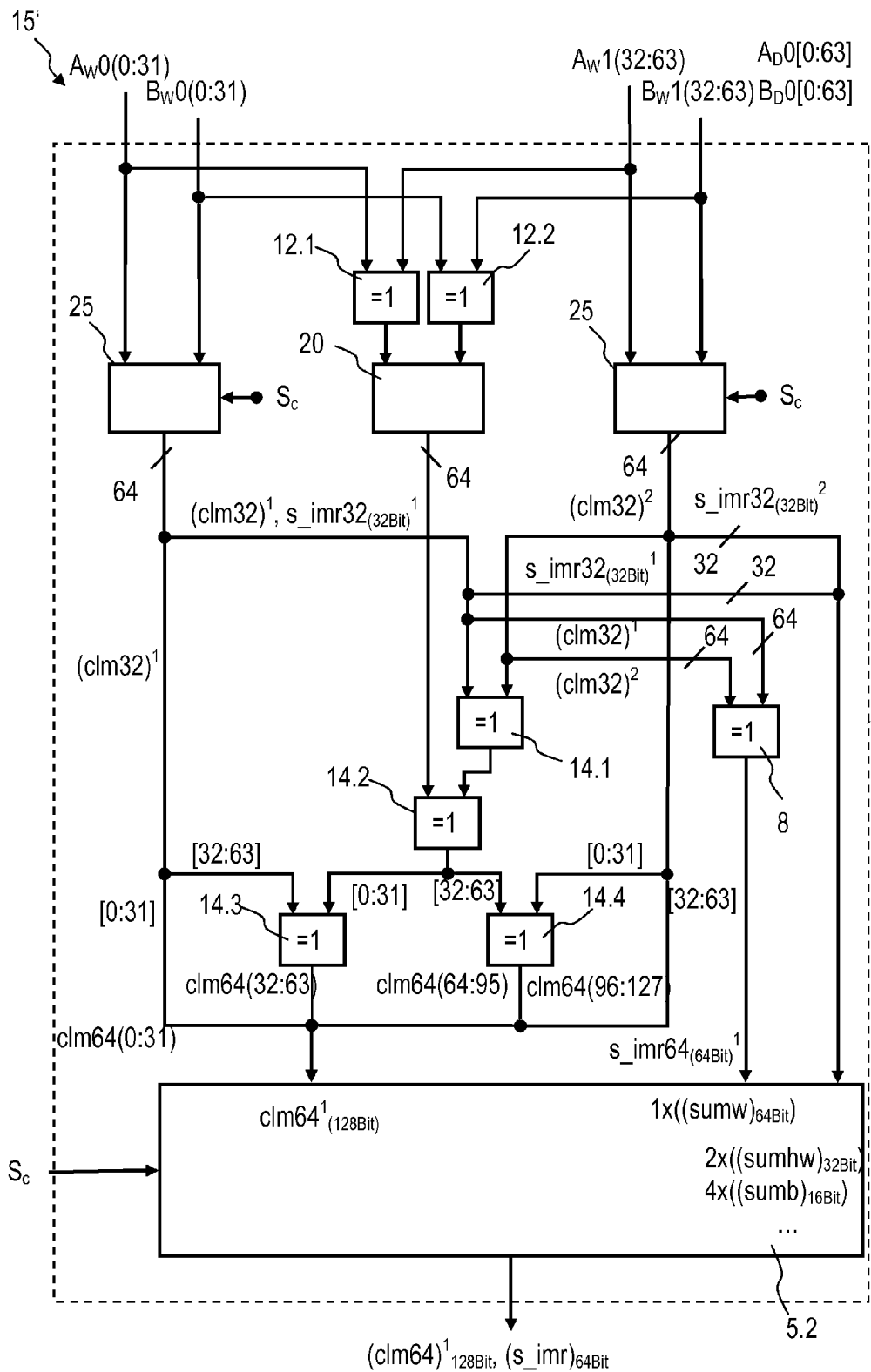
FIG. 2 is a schematic block diagram of a sublevel (j−1) of the hierarchical structure of the data processing unit, in accordance with certain embodiments.
Figure 3:
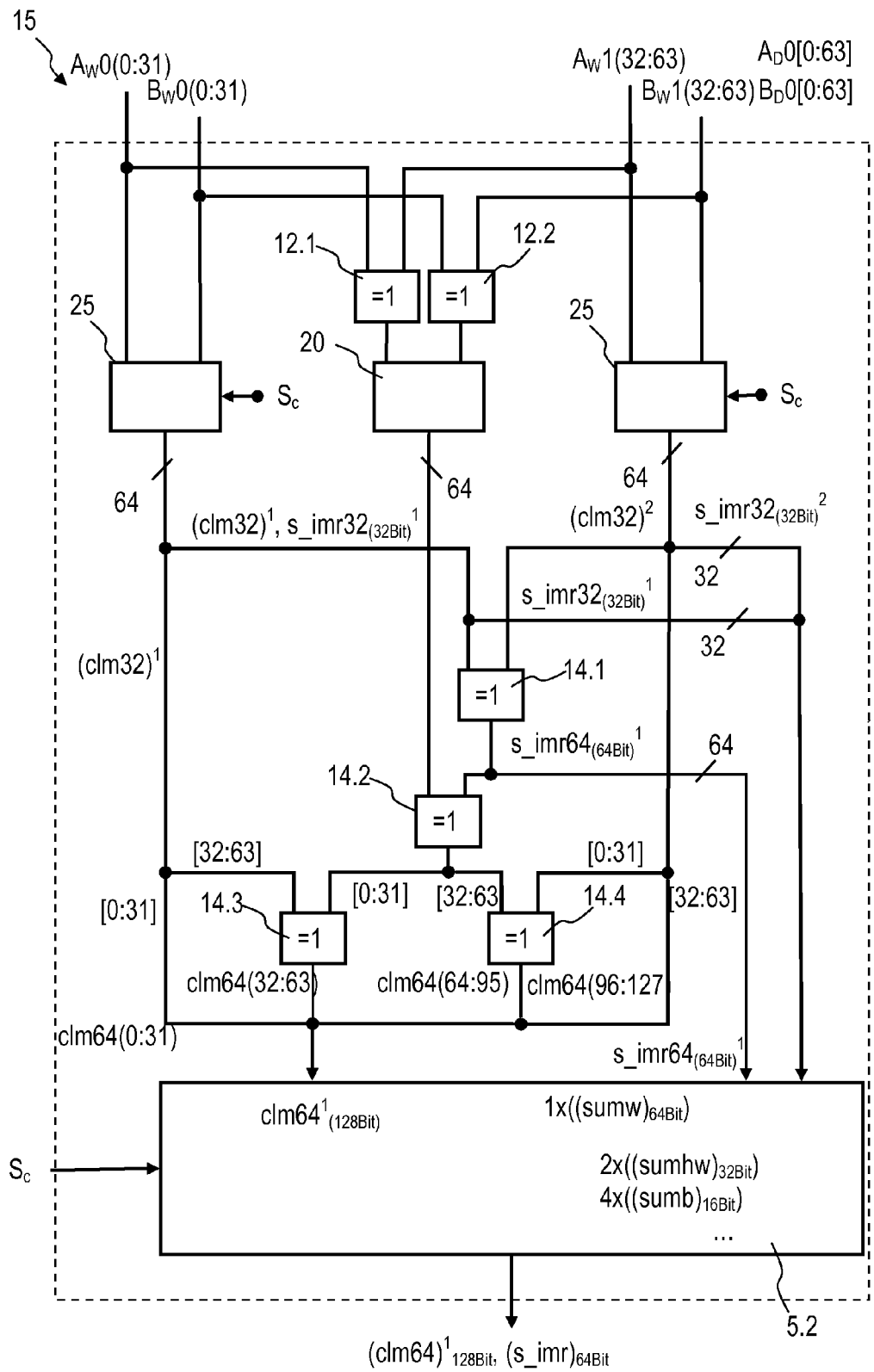
FIG. 3 is a schematic block diagram of the sublevel (j−1) of the hierarchical structure of the data processing unit, in accordance with certain embodiments.
Figure 4:
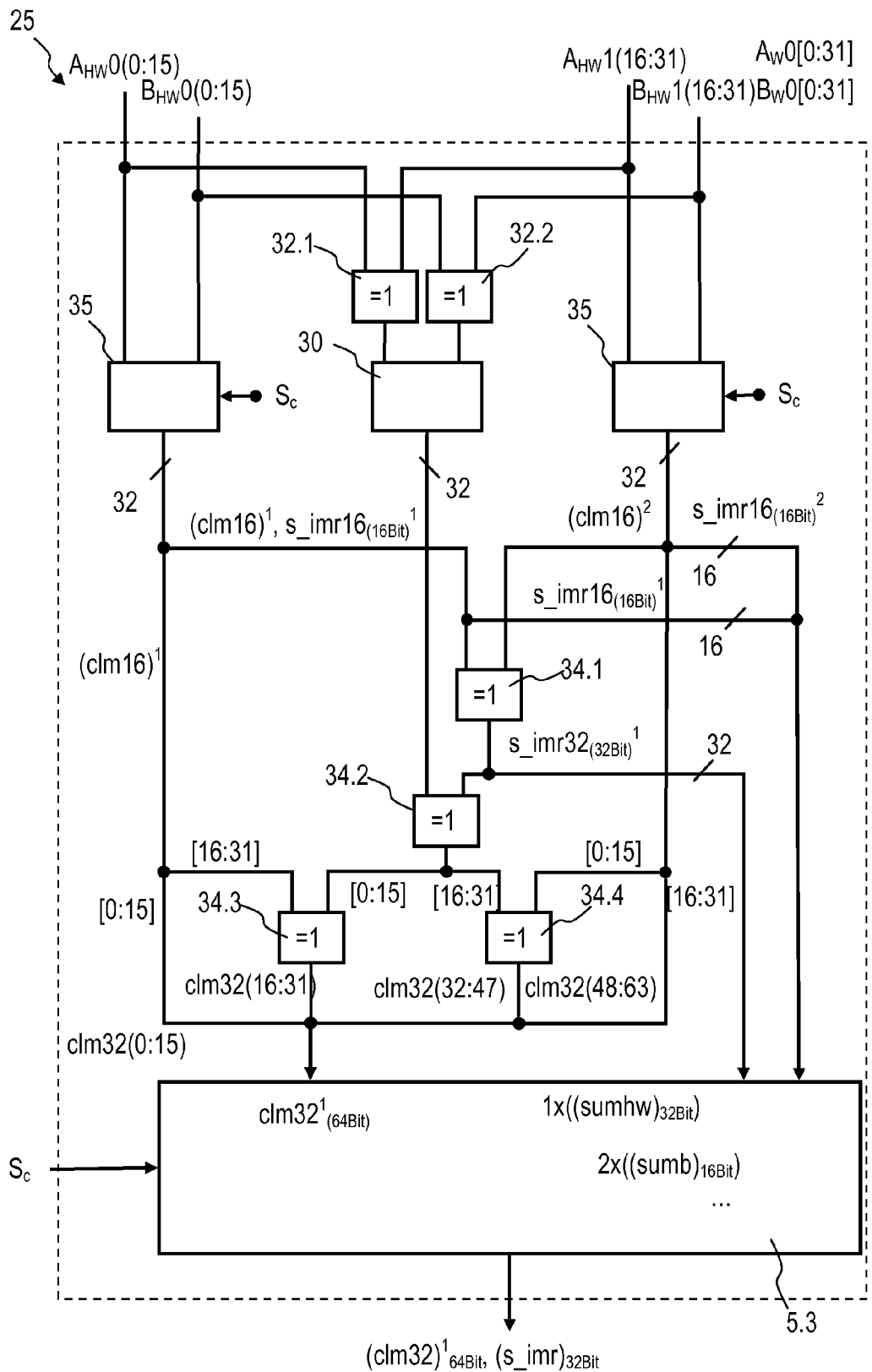
FIG. 4 is a schematic block diagram of a sublevel (j−2) of the hierarchical structure of the data processing unit, in accordance with some embodiments.
Figure 5:
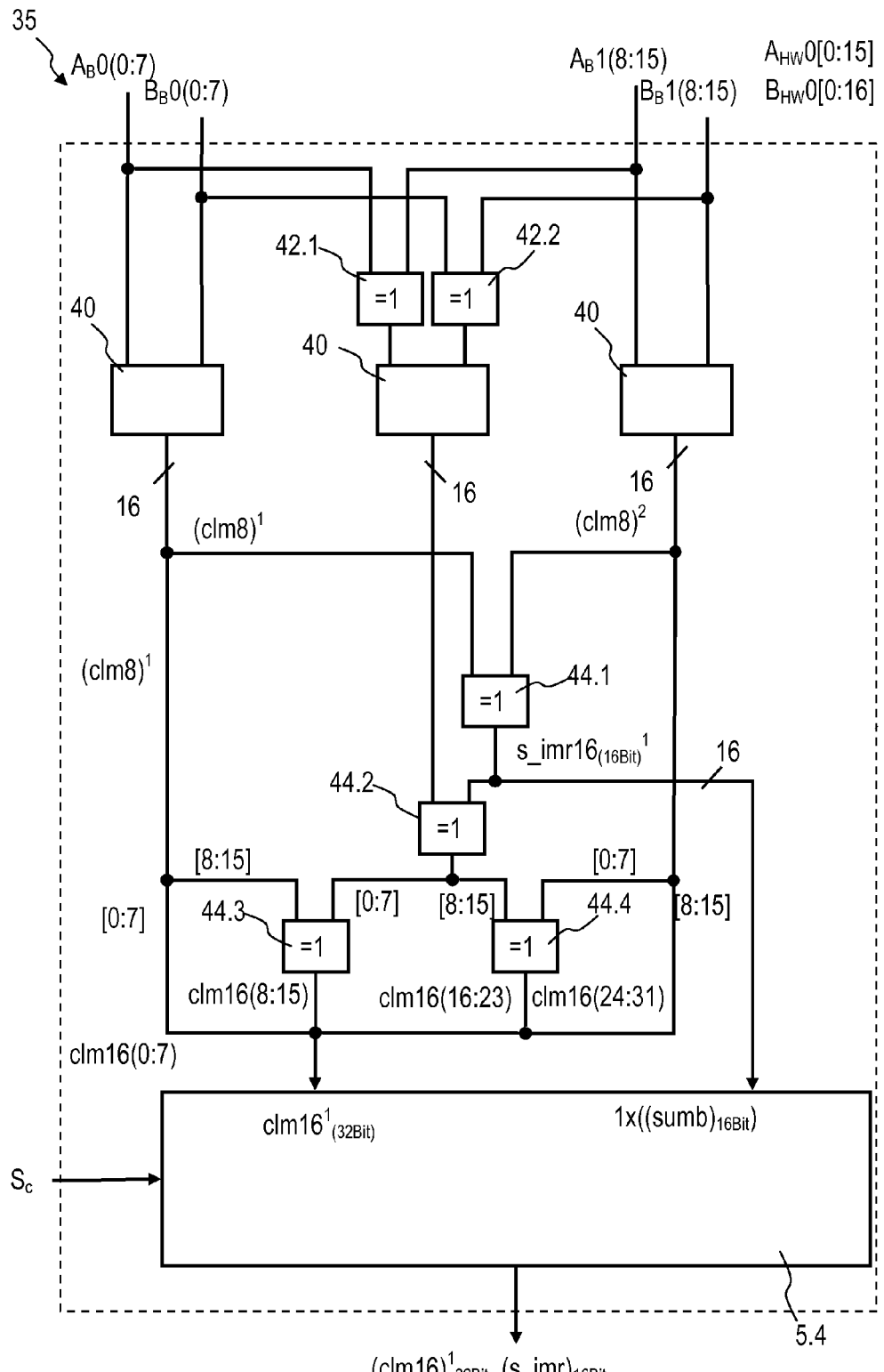
FIG. 5 is a schematic block diagram of a sublevel (j−3) of the hierarchical structure of the data processing unit, in accordance with certain embodiments.
Figure 6:
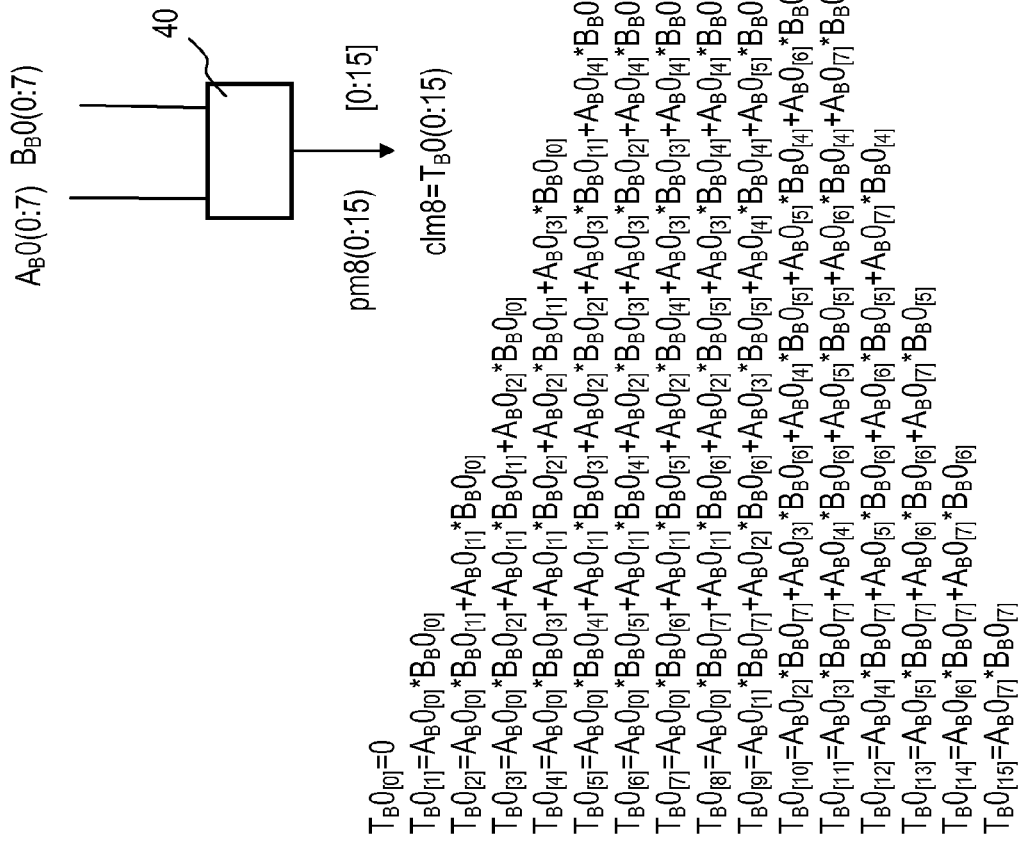
FIG. 6 is a schematic block diagram of a bottom level (j−4) of the hierarchical structure of the data processing unit, in accordance with some embodiments.

FIGS. 1 to 6 show a hierarchical structure of a data processing unit 1 for calculating at least one multiply-sum of two carry-less multiplications of two input operands, in accordance with certain embodiments; wherein FIG. 1 shows a top level (j=5) of the hierarchical structure of the data processing unit 1; FIG. 2 shows a first embodiment of one block of sublevel (j−1=4) of the hierarchical structure of the data processing unit 1; FIG. 3 shows a second embodiment of one block of sublevel (j−1=4) of the hierarchical structure of the data processing unit 1; FIG. 4 shows one block of sublevel (j−2=3) of the hierarchical structure of the data processing unit 1; FIG. 5 shows one block of sublevel (j−3=2) of the hierarchical structure of the data processing unit 1; and FIG. 6 shows one block of a bottom level (j−4=1) of the hierarchical structure of the data processing unit 1.

Referring to FIGS. 1 to 6, a data processing unit 1 capable of performing a calculation of at least one multiply-sum of two carry-less multiplications of two input operands is illustrated. The data processing unit 1 includes two input data busses VA[0:127], VB[0:127] for the input operands $A_xY$, $B_xY$ and an output data bus VT[0:127] for an overall calculation result $SM_{result}$, each including a width of 2n bits, with n=2, 3, . . . . The data processing unit 1 also includes a hierarchical structure having at least two levels for calculating at least one of different carry-less multiplication results clm64, clm32, clm16, clm8 and intermediate multiply-sum results s_imr64, s_imr32, s_imr16, calculating the at least one multiply-sum result (sumd)$_{128Bit}$, (sumw)$_{64Bit}$, (sumhw)$_{32Bit}$, (sumb)$_{16Bit}$ and at least one intermediate multiply-sum result s_imr64, s_imr32, s_imr16 of a level (i) based on the carry-less multiplication results clm64, clm32, clm16, clm8 of a level (i−1), and outputting a certain number of multiply-sum results (sumd)$_{128Bit}$, (sumw)$_{64Bit}$, (sumhw)$_{32Bit}$, (sumb)$_{16Bit}$ as overall calculation result $SM_{result}$ depending on mode of operation using full width (2n) of the output data bus VT[0:127]. In the illustrated embodiment, the hierarchical structure has five levels.

Referring to FIG. 1, the top level (j=5) of the hierarchical structure of the data processing unit 1 includes two enhanced 64×64 bit polynomial multiplier blocks 15, 15' providing two carry-less multiplication results (clm64)[1], (clm64)[2] or two intermediate multiply-sum results s_imr64[1], s_imr64[2] based on a control signal $S_c$ representing an mode of operation. In one mode, a first enhanced 64×64 bit polynomial multiplier block 15, 15' is providing a first multiplication result (clm64)[1]

of two input operands $A_D0$, $B_D0$ each including a width of 64 bits. In another mode, the first multiplier block 15, 15' is providing a first intermediate multiply-sum result s_imr$64^1$. Furthermore, in one mode, a second enhanced 64×64 bit polynomial multiplier block 15, 15' is providing a second multiplication result (clm64)$^2$ of two input operands $A_D1$, $B_D1$ each includes a width of 64 bits. In another mode, the second multiplier block 15, 15' is providing a second intermediate multiply-sum result s_imr$64^2$.

Still referring to FIG. 1, the top level (j=5) of the hierarchical structure of the data processing unit 1 includes an XOR-Adder 4 for adding bitwise the two carry-less multiplication results (clm64)$^1$, (clm64)$^2$ of level (j−1=4) and for providing the corresponding multiply-sum result (sumd)$_{128Bit}$ to a first multiplexer 5.1. Further, the XOR-Adder 4 uses the full bit width of the carry-less multiplication results (clm64)$^1$, (clm64)$^2$ of level (4) for calculating the multiply-sum result (sumd)$_{128Bit}$ of the top level (5). For determining the intermediate multiply-sum results s_imr$64^1$, s_imr$64^2$ of level (5), half of the bit width of the two carry-less multiplication results (clm64)$^1$, (clm64)$^2$ are used and combined to provide two multiply-sum results (sumw)$_{64Bit}$ or four multiply-sum results (sumhw)$_{32Bit}$ or eight multiply-sum results (sumb)$_{16Bit}$ to the first multiplexer 5.1 based on the mode of operation. The two carry-less multiplication results (clm64)$^1$, (clm64)$^2$ and the intermediate multiply-sum results s_imr$64^1$, s_imr$64^2$ are calculated in level (j−1=4) of the hierarchical structure. The first multiplexer 5.1 is outputting the multiply-sum result (sumd)$_{128Bit}$ or two multiply-sum results (sumw)$_{64Bit}$ or four multiply-sum results (sumhw)$_{32Bit}$ or eight multiply-sum results (sumb)$_{16Bit}$ to the first multiplexer 5.1 as overall calculation result based on the mode of operation and the corresponding control signal $S_c$.

Referring to FIG. 2, according to a first embodiment, the enhanced 64×64 bit polynomial multiplier blocks 15' of level (j−1=4) of the hierarchical structure of the data processing unit 1 each include two enhanced 32×32 bit polynomial multiplier blocks 25 providing two carry-less multiplication results (clm32)$^1$, (clm32)$^2$ or two intermediate multiply-sum results s_imr$32^1$, s_imr$32^2$ and a 32×32 bit polynomial multiplier block 20 providing a carry-less multiplication result of preprocessed input operands. Beside the input and output signals, the function of the two enhanced 64×64 bit polynomial multiplier blocks 15, 15' are identical; therefore only one enhanced 64×64 bit polynomial multiplier block 15' is described in detail in sake of simplicity.

In one mode, a first enhanced 32×32 bit polynomial multiplier block 25 is providing a multiplication result (clm32)$^1$ of two input operands $A_W0$, $B_W0$ each including a width of 32 bit. In another mode, the first multiplier block 25 is providing a second intermediate multiply-sum result s_imr$32^1$. Furthermore, in one mode, a second enhanced 32×32 bit polynomial multiplier block 25 is providing a second multiplication result (clm32)$^2$ of two input operands $A_W1$, $B_W1$ each including a width of 32 bit, and in another mode, the second multiplier block 25 is providing a second intermediate multiply-sum result s_imr$32^2$. To preprocess the input operands to the 32×32 bit polynomial multiplier block 20, a first XOR-Adder 12.1 calculates a sum of a first input operand $A_W0$ and a third input operand $A_W1$, and a second XOR-Adder 12.2 calculates a sum of a second input operand $B_W0$ and a fourth input operand $B_W1$. The result of the carry-less multiplication of the 32×32 bit polynomial multiplier block 20 and the results of the two enhanced 32×32 bit polynomial multiplier blocks 25 are post-processed by a number of XOR-Adders 14.1, 14.2, 14.3, 14.4 to generate the carry-less multiplication result (clm64)$^1$ used in a next higher level (5) of the hierarchical structure. Hereby, the first input operand $A_D0$ of the first enhanced 64×64 bit polynomial multiplier block 15' with 64 bit width is represented by the first and third input operand $A_W0$ and $A_W1$, wherein $A_W0$ is presenting 32 high bits of the input operand $A_D0$, and $A_W1$ is presenting 32 low bits of the input operand $A_D0$. The second input operand $B_D0$ of the first enhanced 64×64 bit polynomial multiplier block 15' with 64 bit width is represented by the second and fourth input operand $B_W0$ and $B_W1$, wherein $B_W0$ is presenting 32 high bits of the input operand $B_D0$, and $B_W1$ is presenting 32 low bits of the input operand $B_D0$.

Still referring to FIG. 2, the first enhanced 64×64 bit polynomial multiplier block 15' includes a further XOR-Adder 8 for adding bitwise the two carry-less multiplication results (clm32)$^1$, (clm32)$^2$ of a next lower level (j−2=3) and for providing the corresponding multiply-sum result (sumw)$_{64Bit}$ to a second multiplexer 5.2. The further XOR-Adder 8 and the post-processing process use the full bit width of the carry-less multiplication results (clm32)$^1$, (clm32)$^2$ of the next lower level (3) for calculating the carry-less multiplication result clm64 and the multiply-sum result (sumw)$_{64Bit}$ of the actual level (4). For determining the intermediate multiply-sum results s_imr$32^1$, s_imr$32^2$ of level (4), half of the bit width of the two carry-less multiplication results (clm32)$^1$, (clm32)$^2$ are used and combined to provide two multiply-sum results (sumhw)$_{32Bit}$ or four multiply-sum results (sumb)$_{16Bit}$ to the second multiplexer 5.2 based on the mode of operation. The two carry-less multiplication results (clm32)$^1$, (clm32)$^2$ and the intermediate multiply-sum results s_imr$32^1$, s_imr$32^2$ are calculated in the next lower level (j−2=3) of the hierarchical structure. The second multiplexer 5.2 is outputting the carry-less multiplication result (clm64)$^1{}_{(128Bit)}$ or the intermediate multiply-sum result s_imr$64^1$ representing the multiply-sum result (sumw)$_{64Bit}$ or two multiply-sum results (sumhw)$_{32Bit}$ or four multiply-sum results (sumb)$_{16Bit}$ based on the mode of operation and the corresponding control signal $S_c$.

Referring to FIG. 3, according to other embodiments, the enhanced 64×64 bit polynomial multiplier blocks 15, 15' of level (j−1=4) of the hierarchical structure of the data processing unit 1 each comprise two enhanced 32×32 bit polynomial multiplier blocks 25 providing two carry-less multiplication results (clm32)$^1$, (clm32)$^2$ or two intermediate multiply-sum results s_imr$32^1$, s_imr$32^2$ and a 32×32 bit polynomial multiplier block 20 providing a carry-less multiplication result of preprocessed input operands. Beside the input and output signals, the function of the two enhanced 64×64 bit polynomial multiplier blocks 15 are identical, therefore only one enhanced 64×64 bit polynomial multiplier block 15 is described in detail in sake of simplicity.

Like the first embodiment of FIG. 2, in one mode, a first enhanced 32×32 bit polynomial multiplier block 25 is providing a multiplication result (clm32)$^1$ of two input operands $A_W0$, $B_W0$ each including a width of 32 bits. In another mode, the first multiplier block 25 is providing a second intermediate multiply-sum result s_imr$64^1$. Furthermore, in one mode, a second enhanced 32×32 bit polynomial multiplier block 25 is providing a second multiplication result (clm32)$^2$ of two input operands $A_W1$, $B_W1$ each including a width of 32 bits. In another mode, the second multiplier block 25 is providing a second intermediate multiply-sum result s_imr$32^2$. To preprocess the input operands to the 32×32 bit polynomial multiplier block 20, a first XOR-Adder 12.1 calculates a sum of a first input operand $A_W0$ and a third input operand $A_W1$, and a second XOR-Adder 12.2 calculates a sum of a second input operand $B_W0$ and a fourth input operand $B_W1$. The result of the carry-less multiplication of the 32×32 bit polynomial multiplier block 20 and the results of the two 32×32 bit polynomial multiplier blocks 25 are post-processed by a number of XOR-Adders 14.1, 14.2, 14.3, and 14.4 to generate the carry-less multiplication result (clm64)$^1$ used in the next higher level (5) of the hierarchical structure. Hereby, the first input operand $A_D0$ of the first enhanced 64×64 bit polynomial multiplier block 15 with 64 bit width is represented by the first and third input operand $A_W0$ and $A_W1$, wherein $A_W0$ is presenting 32 high bits of the input operand $A_D0$, and $A_W1$ is presenting 32 low bits of the input operand $A_D0$. The second input operand $B_D0$ of the first enhanced 64×64 bit polynomial multiplier block 15 with 64 bit width is represented by the second and fourth input operand $B_W0$ and $B_W1$, wherein $B_W0$ is presenting 32 high bits of the input operand $B_D0$, and $B_W1$ is presenting 32 low bits of the input operand $B_D0$.

Still referring to FIG. 3, different to the embodiment in FIG. 2, first enhanced 64×64 bit polynomial multiplier block 15 includes no further XOR-Adder 8. Instead, the result of XOR-Adder 14.1 used for post-processing the results of the enhanced 32×32 bit polynomial multiplier blocks 25 and the 32×32 bit polynomial multiplier block 20 is also used for providing the corresponding multiply-sum result (sumw)$_{64Bit}$ to a second multiplexer 5.2, by adding bitwise the two carry-less multiplication results (clm32)$^1$, (clm32)$^2$ of the next lower level (j−2=3). The XOR-Adder 14.1 and the post-processing process use the full bit width of the carry-less multiplication results (clm32)$^1$, (clm32)$^2$ of the next lower level (3) for calculating the carry-less multiplication result clm64 and the multiply-sum result (sumw)$_{64Bit}$ of the actual level (4). For determining the intermediate multiply-sum results s_imr32$^1$, s_imr32$^2$ of level (4), half of the bit width of the two carry-less multiplication results (clm32)$^1$, (clm32)$^2$ is used and combined to provide two multiply-sum results (sumhw)$_{32Bit}$ or four multiply-sum results (sumb)$_{16Bit}$ to the second multiplexer 5.2 based on the mode of operation. The two carry-less multiplication results (clm32)$^1$, (clm32)$^2$ and the intermediate multiply-sum results s_imr32$^1$, s_imr32$^2$ are calculated in level (j−2=3) of the hierarchical structure. The second multiplexer 5.2 outputs the carry-less multiplication result (clm64)$^1{}_{(128Bit)}$ or the intermediate multiply-sum result s_imr64$^1$ representing the multiply-sum result (sumw)$_{64Bit}$ or two multiply-sum results (sumhw)$_{32Bit}$ or four multiply-sum results (sumb)$_{16Bit}$ based on the mode of operation and the corresponding control signal $S_c$.

Referring to FIG. 4, each of the enhanced 32×32 bit polynomial multiplier blocks 25 of level (j−2=3) of the hierarchical structure of the data processing unit 1 includes two enhanced 16×16 bit polynomial multiplier blocks 35 providing two carry-less multiplication results (clm16)$^1$, (clm16)$^2$ or two intermediate multiply-sum results s_imr16$^1$, s_imr16$^2$, and one 16×16 bit polynomial multiplier block 30 providing a carry-less multiplication result of preprocessed input operands. Beside the input and output signals, the function of the two enhanced 32×32 bit polynomial multiplier blocks 25 are identical, therefore only one enhanced 32×32 bit polynomial multiplier block 25 is described in detail in sake of simplicity.

In one mode, a first enhanced 16×16 bit polynomial multiplier block 35 is providing a multiplication result (clm16)$^1$ of two input operands $A_{HW}0$, $B_{HW}0$ each including a width of 16 bits. In another mode, the first multiplier block 35 is providing a second intermediate multiply-sum result s_imr16$^1$. Furthermore, in one mode, a second enhanced 16×16 bit polynomial multiplier block 35 is providing a second multiplication result (clm16)$^2$ of two input operands $A_{HW}1$, $B_{HW}1$ each including a width of 16 bit in one mode, and in another mode, the second multiplier block 35 is providing a second intermediate multiply-sum result s_imr16$^2$.

To preprocess the input operands to the 16×16 bit polynomial multiplier block 30, a first XOR-Adder 32.1 calculates a sum of a first input operand $A_{HW}0$ and a third input operand $A_{HW}1$, and a second XOR-Adder 32.2 calculates a sum of a second input operand $B_{HW}0$ and a fourth input operand $B_{HW}1$. The result of the carry-less multiplication of the 16×16 bit polynomial multiplier block 30 and the results of the two enhanced 16×16 bit polynomial multiplier blocks 35 are post-processed by a number of XOR-Adders 34.1, 34.2, 34.3, and 34.4 to generate the carry-less multiplication result (clm32)$^1$ used in the next higher level (4) of the hierarchical structure. Hereby, the first input operand $A_W0$ of the first enhanced 32×32 bit polynomial multiplier block 25 with 32 bit width is represented by the first and third input operand $A_{HW}0$ and $A_{HW}1$, wherein $A_{HW}0$ is presenting 16 high bits of the input operand $A_W0$, and $A_{HW}1$ is presenting 16 low bits of the input operand $A_W0$. The second input operand $B_W0$ of the first enhanced 32×32 bit polynomial multiplier block 25 with 32 bit width is represented by the second and fourth input operand $B_{HW}0$ and $B_{HW}1$, wherein $B_{HW}0$ is presenting 16 high bits of the input operand $B_W0$, and $B_{HW}1$ is presenting 16 low bits of the input operand $B_W0$.

Still referring to FIG. 4, like the enhanced 64×64 bit polynomial multiplier blocks 15 of FIG. 3 the first enhanced 32×32 bit polynomial multiplier block 25 includes no further XOR-Adder. Instead, the result of XOR-Adder 34.1 used for post-processing the results of the enhanced 16×16 bit polynomial multiplier blocks 35 and the 16×16 bit polynomial multiplier block 30 is also used for providing the corresponding multiply-sum result (sumhw)$_{32Bit}$ to a third multiplexer 5.3, by adding bitwise the two carry-less multiplication results (clm16)$^1$, (clm16)$^2$ of the next lower level (j−3=2). The XOR-Adder 34.1 and the post-processing process use the full bit width of the carry-less multiplication results (clm16)$^1$, (clm16)$^2$ of the next lower level (2) for calculating the carry-less multiplication result clm32 and the multiply-sum result (sumhw)$_{32Bit}$ of the actual level (3). For determining the intermediate multiply-sum result s_imr16$^1$, s_imr16$^2$ of level (3), half of the bit width of the two carry-less multiplication results (clm16)$^1$, (clm16)$^2$ are used and combined to provide two multiply-sum results (sumb)$_{16Bit}$ to the third multiplexer 5.3 based on the mode of operation. The two carry-less multiplication results (clm16)$^1$, (clm16)$^2$ and the intermediate multiply-sum results s_imr6$^1$, s_imr16$^2$ are calculated in the next lower level (j−3=2) of the hierarchical structure. The third multiplexer 5.3 outputs the carry-less multiplication result (clm32)$^1{}_{(64Bit)}$ or the intermediate multiply-sum result s_imr32$^1$ representing the multiply-sum result (sumhw)$_{32Bit}$ or two multiply-sum results (sumb)$_{16Bit}$ based on the mode of operation and the corresponding control signal $S_c$.

In certain implementations, like the enhanced 64×64 bit polynomial multiplier blocks 15, 15' of FIG. 2, the first enhanced 64×64 bit polynomial multiplier block 25 may include a further XOR-Adder for adding bitwise the two carry-less multiplication results (clm16)$^1$, (clm16)$^2$ of the next lower level (j−3=2) and for providing the corresponding multiply-sum result (sumhw)$_{32Bit}$ to the third multiplexer 5.3.

Referring to FIGS. 2 and 3, the shown 32×32 bit polynomial multiplier block 20 provides a carry-less multiplication result of preprocessed input operands and includes three 16×16 bit polynomial multiplier blocks providing carry-less multiplication results. One of the 16×16 bit polynomial multiplier blocks provides a carry-less multiplication result of preprocessed input operands. To preprocess the input operands to the 16×16 bit polynomial multiplier block 20 XOR-Adders calculate different sums of the input operands to the 32×32 bit polynomial multiplier block 20. The results of the carry-less multiplications of the 16×16 bit polynomial multiplier blocks are post-processed by a number of XOR-Adders to generate and output the carry-less multiplication result of the preprocessed input operands. Unlike the enhanced 32×32 bit polynomial multiplier blocks 25, the 32×32 bit polynomial multiplier blocks 20 are not using a multiplexer and provide no multiply-sum results.

Referring to FIG. 5, each of the enhanced 16×16 bit polynomial multiplier blocks 35 of level (j−3=2) of the hierarchical structure of the data processing unit 1 comprise three 8×8 bit polynomial multiplier blocks 40. Two of them provide two carry-less multiplication results (clm8)$^1$, (clm8)$^2$. One 16×16 bit polynomial multiplier block 40 provides a carry-less multiplication result of preprocessed input operands. Beside the input and output signals, the function of the two enhanced 16×16 bit polynomial multiplier blocks 35 are identical, therefore only one enhanced 16×16 bit polynomial multiplier block 35 is described in detail in sake of simplicity.

A first 8×8 bit polynomial multiplier block 40 is providing a multiplication result (clm8)$^1$ of two input operands $A_B0$, $B_B0$ each includes a width of 8 bits. A second enhanced 8×8 bit polynomial multiplier block 40 is providing a second multiplication result (clm8)$^2$ of two input operands $A_B1$, $B_B1$ each including a width of 8 bits. To preprocess the input operands to a third 8×8 bit polynomial multiplier block 40 a first XOR-Adder 42.1 calculates a sum of a first input operand $A_B0$ and a third input operand $A_B1$, and a second XOR-Adder 42.2 calculates a sum of a second input operand $B_B0$ and a fourth input operand $B_B1$. The results of the carry-less multiplications of the 8×8 bit polynomial multiplier blocks 40 are post-processed by a number of XOR-Adders 44.1, 44.2, 44.3, and 44.4 to generate the carry-less multiplication result (clm16)$^1$ used in the next higher level (3) of the hierarchical structure. Hereby, the first input operand $A_{HW}0$ of the first enhanced 16×16 bit polynomial multiplier block 35 with 16 bit width is represented by the first and third input operand $A_B0$ and $A_B1$, wherein $A_B0$ is presenting 8 high bits of the input operand $A_{HW}0$, and $A_B1$ is presenting 8 low bits of the input operand $A_{HW}0$. The second input operand $B_B0$ of the first enhanced 16×16 bit polynomial multiplier block 35 with 16 bit width is represented by the second and fourth input operand $B_B0$ and $B_B1$, wherein $B_B0$ is presenting 8 high bits of the input operand $B_{HW}0$, and $B_B1$ is presenting 8 low bits of the input operand $B_{HW}0$.

Still referring to FIG. 5, like the enhanced 64×64 bit polynomial multiplier blocks 15 of FIG. 3, the first enhanced 16×16 bit polynomial multiplier block 35 includes no further XOR-Adder. Instead, the result of XOR-Adder 44.1 used for post-processing the results of the 8×8 bit polynomial multiplier blocks 40 is also used for providing the corresponding multiply-sum result (sumb)$_{16Bit}$ to a fourth multiplexer 5.4, by adding bitwise the two carry-less multiplication results (clm8)$^1$, (clm8)$^2$ of a next lower level (j−4=1). The XOR-Adder 44.1 and the post-processing process use the full bit width of the carry-less multiplication results (clm8)$^1$, (clm8)$^2$ of level (1) for calculating the carry-less multiplication result clm16 and the multiply-sum result (sumb)$_{16Bit}$ of the actual level (2). The two carry-less multiplication results (clm8)$^1$, (clm8)$^2$ are calculated in the next lower level (j−4=1) of the hierarchical structure. Since the next lower level is the bottom level (1), no intermediate multiply-sum results are provided to the fourth multiplexer 5.4, which is outputting the carry-less multiplication result clm16 or the multiply-sum result (sumb)$_{16Bit}$ of the actual level (2) based on the mode of operation.

In certain implementations, like the enhanced 64×64 bit polynomial multiplier blocks 15, 15' of FIG. 2, the first enhanced 16×16 bit polynomial multiplier block 35 may include a further XOR-Adder for adding bitwise the two carry-less multiplication results (clm8)$^1$, (clm8)$^2$ of level (j−4=1) and for providing the corresponding multiply-sum result (sumb)$_{16Bit}$ to the fourth multiplexer 5.4.

Referring to FIG. 4, the shown 16×16 bit polynomial multiplier block 30 provides a carry-less multiplication result of preprocessed input operands and includes three 8×8 bit polynomial multiplier blocks providing carry-less multiplication results. One of the 8×8 bit polynomial multiplier blocks provides a carry-less multiplication result of preprocessed input operands. To preprocess the input operands to the 8×8 bit polynomial multiplier block, XOR-Adders calculate different sums of the input operands to the 16×16 bit polynomial multiplier block 30. The results of the carry-less multiplications of the 8×8 bit polynomial multiplier blocks are post-processed by a number of XOR-Adders to generate and output the carry-less multiplication result of the preprocessed input operands. Unlike the enhanced 16×16 bit polynomial multiplier blocks 35, the 16×16 bit polynomial multiplier blocks 30 are not using a multiplexer and provide no multiply-sum results.

Referring to FIG. 6, the shown 8×8 bit polynomial multiplier block 40 of a bottom level (j−4=1) of the hierarchical structure of the data processing unit 1 calculates and outputs as basic multiplier a carry-less multiplication result clm8, of two input operands $A_B0$, $B_B0$ with a basic width of 8 bits. The schematic of FIG. 6 shows how the single bit of the multiplication result are determined, in the shown embodiment. The 8×8 bit polynomial multiplier blocks 40 are also not using a multiplexer and provide no multiply-sum results.

In the illustrated embodiments, the hierarchical structure of the data processing unit 1 is implemented as Karatsuba-Ofman structure. In described embodiments, the bottom level (1) contains 8×8 bit polynomial multiplier blocks 40, but also 4×4 bit polynomial multiplier blocks or 2×2 bit polynomial multiplier blocks 40 can be used on the bottom level of the hierarchical structure for parallel calculating carry-less multiplication results as base for the further calculation of multiply-sum results at higher levels. In the shown embodiment, at the top level of the hierarchical structure 64×64 bit polynomial multiplier blocks 15, 15' are used to calculate the highest multiply-sum result (sumd)$_{128Bit}$, but also 128×128 bit polynomial multiplier blocks or even larger multiplier blocks like 256×256 bit polynomial multiplier blocks may be used to calculate multiply-sum results.

Figures 7, 8:
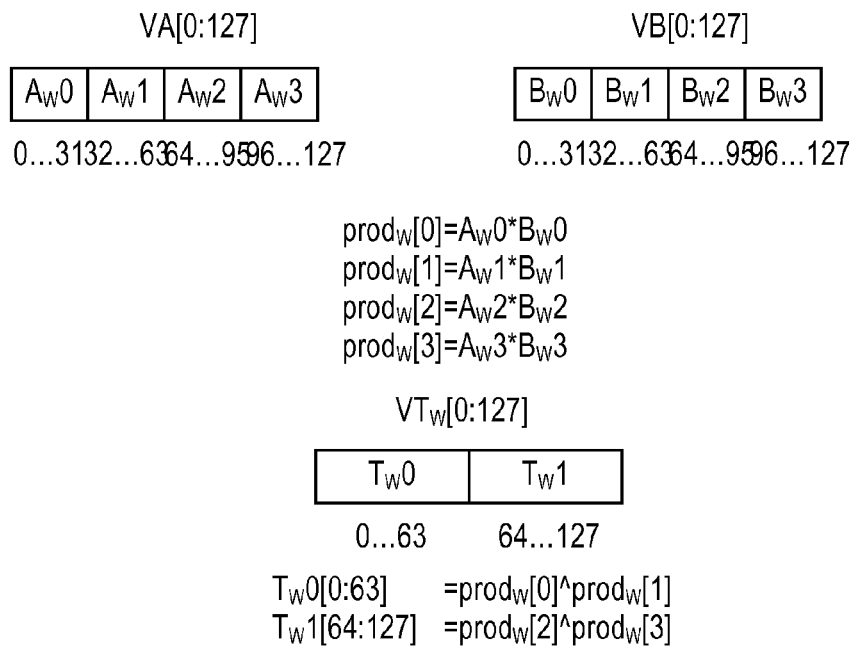
FIG. 7 is a schematic diagram of a polynomial multiply-sum on double-word basis.
FIG. 8 is a schematic diagram of a polynomial multiply-sum on word basis.

FIGS. 7 to 10 show different multiply-sum results dependent on mode of operation, wherein FIG. 7 shows a polynomial multiply-sum on double-word basis; FIG. 8 shows a polynomial multiply-sum on word basis; FIG. 9 shows a polynomial multiply-sum on half-word basis; and FIG. 10 shows a polynomial multiply-sum on byte basis.

Referring to FIG. 7, in a first mode of operation, the data on the first input data bus VA is interpreted as two input operands $A_D0$ and $A_D1$, and the data on the second input data bus VB is also interpreted as two input operands $B_D0$ and $B_D1$, wherein all input operands have a width of 64 bits. So the first multiplexer 5.1 of the shown embodiment of the data processing unit 1 is outputting the first multiply-sum ((sumd)$_{128Bit}$)=$T_D$ as overall calculation result (SM$_{result}$) on the output data bus VT. In the first mode of operation, all multiplexers 5.2, 5.3, 5.4 of sublevels (4), (3), (2) of the hierarchical structure output the corresponding carry-less multiplication results clm64, clm32, clm16 to the next higher level, and the 8×8 bit polynomial multiplier blocks 40 of the bottom level (1) output carry-less multiplication results clm8 to the next higher level (2). In the first mode of operation, it is also possible to calculate and output a carry-less multiplication result of two input operands with a width of 64 bits by masking the input operands, wherein the multiplication result has a width of 128 bits.

Referring to FIG. 8, in a second mode of operation, the data on the first input data bus VA is interpreted as four input operands $A_W0$, $A_W1$, $A_W2$ and $A_W3$, and the data on the second input data bus VB is also interpreted as four input operands $B_W0$, $B_W1$, $B_W2$ and $B_W3$, wherein all input operands have a width of 32 bits. So the first multiplexer 5.1 of the shown embodiment of the data processing unit 1 is outputting the first intermediate summing result s_imr64 as overall calculation result ($SM_{result}$) on the output data bus VT. The first intermediate summing result s_imr64 is representing two multiply-sum results $T_W0$, $T_W1$. In the second mode of operation, the second multiplexer 5.2 of sublevel (4) of the hierarchical structure output the corresponding multiply-sum results (sumw)$_{64Bit}$ to the top level (5), and the multiplexer 5.3, 5.4 of lower sublevels (3), (2) of the hierarchical structure output the corresponding carry-less multiplication results clm32, clm16 to the next higher level, and the 8×8 bit polynomial multiplier blocks 40 of the bottom level (1) output carry-less multiplication results clm8 to the next higher level (2). In the second mode of operation, it is also possible by masking the input operands to calculate and output two carry-less multiplication results of two input operands with a width of 32 bits, wherein each multiplication result has a width of 64 bits.

Referring to FIG. 9, in a third mode of operation, the data on the first input data bus VA is interpreted as eight input operands $A_{HW}0$, $A_{HW}1$, $A_{HW}2$, $A_{HW}3$, $A_{HW}4$, $A_{HW}5$, $A_{HW}6$, and $A_{HW}7$, and the data on the second input data bus VB is also interpreted as eight input operands $B_{HW}0$, $B_{HW}1$, $B_{HW}2$, $B_{HW}3$, $B_{HW}4$, $B_{HW}5$, $B_{HW}6$, and $B_{HW}7$, wherein all input operands have a width of 16 bits. So the first multiplexer 5.1 of the shown embodiment of the data processing unit 1 is outputting the first intermediate summing result s_imr64 as overall calculation result ($SM_{result}$) on the output data bus VT. The first intermediate summing result s_imr64 is representing four multiply-sum results $T_{HW}0$, $T_{HW}1$, $T_{HW}2$, and $T_{HW}3$. In the third mode of operation, the second multiplexer 5.2 of sublevel (4) of the hierarchical structure output the corresponding multiply-sum results (sumw)$_{64Bit}$ to the top level (5), the third multiplexer 5.3 of sublevel (3) of the hierarchical structure outputs the corresponding multiply-sum results (sumhw)$_{32Bit}$ to sublevel (4), the multiplexer 5.4 of the lower sublevel (2) of the hierarchical structure outputs the corresponding carry-less multiplication results clm16 to the next higher level (3), and the 8×8 bit polynomial multiplier blocks 40 of the bottom level (1) output carry-less multiplication results clm8 to the next higher level (2). In the third mode of operation, it is also possible by masking the input operands to calculate and output four carry-less multiplication results of two input operands with a width of 16 bits, wherein each multiplication result has a width of 32 bits.

Referring to FIG. 10, in a fourth mode of operation, the data on the first input data bus VA is interpreted as sixteen input operands $A_B0$, $A_B1$, $A_B2$, $A_B3$, $A_B4$, $A_B5$, $A_B6$, $A_{HW}7$, $A_{HW}8$, $A_B9$, $A_B10$, $A_B11$, $A_B12$, $A_b13$, $A_B14$, and $A_B15$, and the data on the second input data bus VB is also interpreted as sixteen input operands $B_B0$, $B_B1$, $B_B2$, $B_B3$, $B_b4$, $B_B5$, $B_B6$, $B_{HW}7$, $B_{HW}8$, $B_B9$, $B_B10$, $B_B11$, $B_B12$, $B_b13$, $B_B14$, and $B_B15$, wherein all input operands have a width of 8 bits. So the first multiplexer 5.1 of the shown embodiment of the data processing unit 1 is outputting the first intermediate summing result s_imr64 as overall calculation result ($SM_{result}$) on the output data bus VT. The first intermediate summing result s_imr64 is representing eight multiply-sum results $T_B0$, $T_B1$, ..., $T_B7$. In the fourth mode of operation, the second multiplexer 5.2 of sublevel (4) of the hierarchical structure outputs the corresponding multiply-sum results (sumw)$_{64Bit}$ to the top level (5), the third multiplexer 5.3 of sublevel (3) of the hierarchical structure outputs the corresponding multiply-sum results (sumhw)$_{32Bit}$ to sublevel (4), the multiplexer 5.4 of sublevel (2) of the hierarchical structure outputs the corresponding multiply-sum results (sumb)$_{16Bit}$ to the next higher sublevel (3), and the 8×8 bit polynomial multiplier blocks 40 of the bottom level (1) output carry-less multiplication results clm8 to the next higher level (2). In the fourth mode of operation, it is also possible by masking the input operands to calculate and output eight carry-less multiplication results of two input operands with a width of 8 bits, wherein each multiplication result has a width of 16 bits.

Various implementations can be implemented as an entirely software embodiment or an embodiment containing both hardware and software elements. Software may include, but is not limited to, firmware, resident software, microcode, etc.

Furthermore, various implementations can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The invention claimed is:

1. A method for calculating at least one multiply-sum of two carry-less multiplications of two input operands, the method comprising:
using input data busses for said input operands and an output data bus for an overall calculation result, each bus comprising a width of 2n bits, where n is an integer greater than one;

calculating, via multiplier circuitry, said carry-less multiplications of said two input operands for a lower level of a hierarchical structure;

calculating said at least one multiply-sum and at least one intermediate multiply-sum for a higher level of the hierarchical structure based on said carry-less multiplications of the lower level;

in a top level of said hierarchical structure, calculating and outputting a first multiply-sum of two carry-less multiplications of two input operands each comprising a width of n bits by using a bit-wise exclusive OR function;

in a first mode of operation, outputting said first multiply-sum as overall calculation result, and in an at least one further mode of operation:

calculating $2^k$ intermediate multiply-sums of two carry-less multiplications of two input operands each comprising a width of $n/2^k$ bits, with $k=1, 2, \ldots$, depending on said further mode of operation, by using exclusive OR functions in sub-levels of said hierarchical structure for summing said multiplications; and outputting said $2^k$ intermediate multiply-sum results as said overall calculation result.

2. The method according to claim 1, comprising:

using full bit width of said carry-less multiplications of said lower level for calculating said at least one multiply-sum result of said higher level, and using half of said bit width of said carry-less multiplications of said lower level for calculating said at least one intermediate multiply-sum of said higher level.

3. The method according to claim 1, comprising, in a bottom level of said hierarchical structure, calculating and outputting carry-less basic multiplication of two input operands each comprising a certain basic width of m bits, where m is greater than 1, $n/m=2^j$, and $j=0, 1, 2, \ldots$.

4. A data processing unit for calculating at least one multiply-sum of two carry-less multiplications of two input operands, comprising:

multiplier circuitry;

input data busses to said multiplier circuitry for said input operands, each bus comprising a width of 2n bits, where n is an integer greater than one;

a hierarchical structure comprising:

a lower level for calculating said carry-less multiplications of said two input operands, and a higher level for calculating said at least one multiply-sum and at least one intermediate multiply-sum based on said carry-less multiplications of the lower level; and an output data bus for outputting a certain number of multiply-sum results as an overall calculation result depending on mode of operation using the full width 2n of said output data bus; and wherein sub levels of said hierarchical structure comprise:

components for calculating $2^k$ intermediate multiply-sum results of two carry-less multiplications of two input operands each comprising a width of $n/2^k$ bits, with $k=1, 2, \ldots$, depending on said mode of operation, and exclusive OR function gates for bit-wise summing and outputting said multiplication results.

5. The data processing unit according to claim 4, wherein said hierarchical structure is adapted to use:

the full bit width of said carry-less multiplication results of said lower level for calculating said at least one multiply-sum result of said higher level, and half of said bit width of said carry-less multiplication results of said level lower for calculating said at least one intermediate multiply-sum result of said higher level.

6. The data processing unit according to claim 4, wherein a top level of said hierarchical structure comprises an exclusive OR function gate that bit-wise calculates a first multiply-sum result of two carry-less multiplications of two input operands each comprising a width of n bits.

7. The data processing unit according to claim 4, wherein a bottom level of said hierarchical structure comprises at least one basic multiplier that calculates and outputs carry-less basic multiplication results of two input operands each comprising a certain basic width of m bits, with $m=2, 3, \ldots$, $n/m=2^j$, and $j=0, 1, 2, \ldots$.

8. The data processing unit according to claim 4, wherein at least one multiplexer for outputting said first multiply-sum as an overall calculation result in a first mode of operation, and for outputting said $2^k$ intermediate multiply-sum results as said overall calculation result in at least one further mode of operation.

9. The data processing unit according to claim 4, wherein said hierarchical structure is implemented as Karatsuba-Ofman structure.

10. The data processing unit according to claim 9, wherein exclusive OR function gates used in sub levels of said structure to calculate said carry-less multiplication results are also used for calculating said $2^k$ intermediate multiply-sum results.

11. A computer program product for calculating at least one multiply-sum of two carry-less multiplications of two input operands, the computer program product comprising:

a non-transitory computer readable medium:

first program instructions to calculate said carry-less multiplications of said two input operands for a lower level of a hierarchical structure; and second program instructions to calculate said at least one multiply-sum and at least one intermediate multiply-sum for a higher level of the hierarchical structure based on said carry-less multiplications of the lower level;

wherein, in a bottom level of said hierarchical structure, third program instructions calculate and output carry-less basic multiplication of two input operands each comprising a certain basic width of m bits, where m is greater than 1, $n/m=2^j$, and $j=0, 1, 2, \ldots$; and in a first mode of operation, fourth program instructions output said first multiply-sum as overall calculation result, and in an at least one further mode of operation, fifth program instructions:

calculate $2^k$ intermediate multiply-sums of two carry-less multiplications of two input operands each comprising a width of $n/2^k$ bits, with $k=1, 2, \ldots$, depending on said further mode of operation, by using exclusive OR functions in sub-levels of said hierarchical structure for summing said multiplications, and output said $2^k$ intermediate multiply-sum results as said overall calculation result; and wherein said first second, third, fourth and fifth program instructions are stored on said computer readable medium.

12. The computer program product according to claim 11, wherein the second program instructions:

use full bit width of said carry-less multiplications of said lower level for calculating said at least one multiply-sum result of said higher level, and use half of said bit width of said carry-less multiplications of said lower level for calculating said at least one intermediate multiply-sum of said higher level.

13. The computer program product according to claim 11, wherein, in a top level of said hierarchical structure, sixth program instructions calculate and output a first multiply-sum of two carry-less multiplications of two input operands each comprising a width of n bits by using a bit-wise exclusive OR function.

\* \* \* \* \*